United States Patent [19]

Way, Jr.

[11] 4,220,141
[45] Sep. 2, 1980

[54] PORTABLE SOLAR COOKER

[76] Inventor: Lee V. Way, Jr., Rt. 8, Box 201, Sumter, S.C. 29150

[21] Appl. No.: 944,511

[22] Filed: Sep. 21, 1978

[51] Int. Cl.³ .............................................. F24J 3/02
[52] U.S. Cl. .................................... 126/451; 126/438
[58] Field of Search ................................ 126/451, 438

[56] References Cited

U.S. PATENT DOCUMENTS

| 3,106,201 | 10/1963 | Steinberg | 126/451 |
| 4,130,106 | 12/1978 | Clevett et al. | 126/438 |

Primary Examiner—Carroll B. Dority, Jr.
Attorney, Agent, or Firm—B. B. Olive

[57] ABSTRACT

A portable solar cooker of the type having an insulated housing with an oven compartment enclosed therein and associated reflector elements is adapted for cooking with the housing and oven compartment in a tilted or level position. When employing only the tilting mode for tracking the sun, reflecting panels are removably attached to the top of the cooker housing. When there is a need to maintain the oven compartment level while tracking the sun during the cooking operation, the reflecting panels are removably mounted on a pivotal frame connected to a telescoping strip assembly which, in turn, is removably mounted on the topside of the cooker housing.

5 Claims, 6 Drawing Figures

PORTABLE SOLAR COOKER

BACKGROUND OF THE INVENTION

1. Field of the Invention

This invention relates generally to portable solar cookers and more particularly to a solar cooker adapted for tracking the sun with the oven maintained in either a tilted or level position.

2. Description of the Prior Art

Solar cookers having a housing construction with solar energy reflectors and means for transferring the solar energy to an oven area are known and have been described in U.S. Pat. Nos. 3,025,851; 3,106,201; 3,156,234; 3,174,476; 3,236,227 and 4,077,391.

One of the shortcomings of these solar cooking constructions is that they require tilting of the oven to provide the proper orientation with respect to the angular attitude of the sun as it moves in its semi-circular path from east to west. This, of course, presents a problem in cooking foods which require a level position at all times during the cooking cycle, e.g., pizza and pot pies.

In U.S. Pat. Nos. 3,938,497 and 4,083,357, solar cooking devices are described which maintain the oven in a level position while tracking the sun during the cooking cycle. However, these constructions do not appear to be very efficient and certainly do not offer a compact, portable unit which would be inexpensive to construct.

It is, therefore, an object of this invention to provide an efficient and inexpensive portable solar cooker in which the oven can be maintained at a level position at all times during the cooking cycle.

SUMMARY OF THE INVENTION

A portable solar cooker is provided with an internally insulated housing having a front opening and associated door and an oven compartment for slidably receiving a cooking tray through the front opening. The solar cooker is adapted either for cooking with the oven compartment in an angled or tilted position or with the oven compartment maintained in a level position. Removable brackets are mounted directly on the top of the housing and receive appropriate sun reflectors when the solar cooker is adapted for cooking with the cooker tilted to insure maximum collection and transfer of solar radiation into the oven compartment for cooking purposes. When it is desired to cook in a level relation, a second set of brackets are installed on top of the housing to replace the first set and a pivotal frame and associated telescoping reflector strip assembly are adjustably mounted thereon. With this assembly installed, the sun reflectors are removably mounted on a top portion of the reflector strip assembly frame and are angularly adjustable thereon. The sun reflectors are positioned by adjusting the telescoping strip assembly so that the sun's radiation is always most advantageously directed into a heat-generating area directly above the oven compartment which can remain level during cooking.

DESCRIPTION OF THE PREFERRED EMBODIMENT

Figure 1:
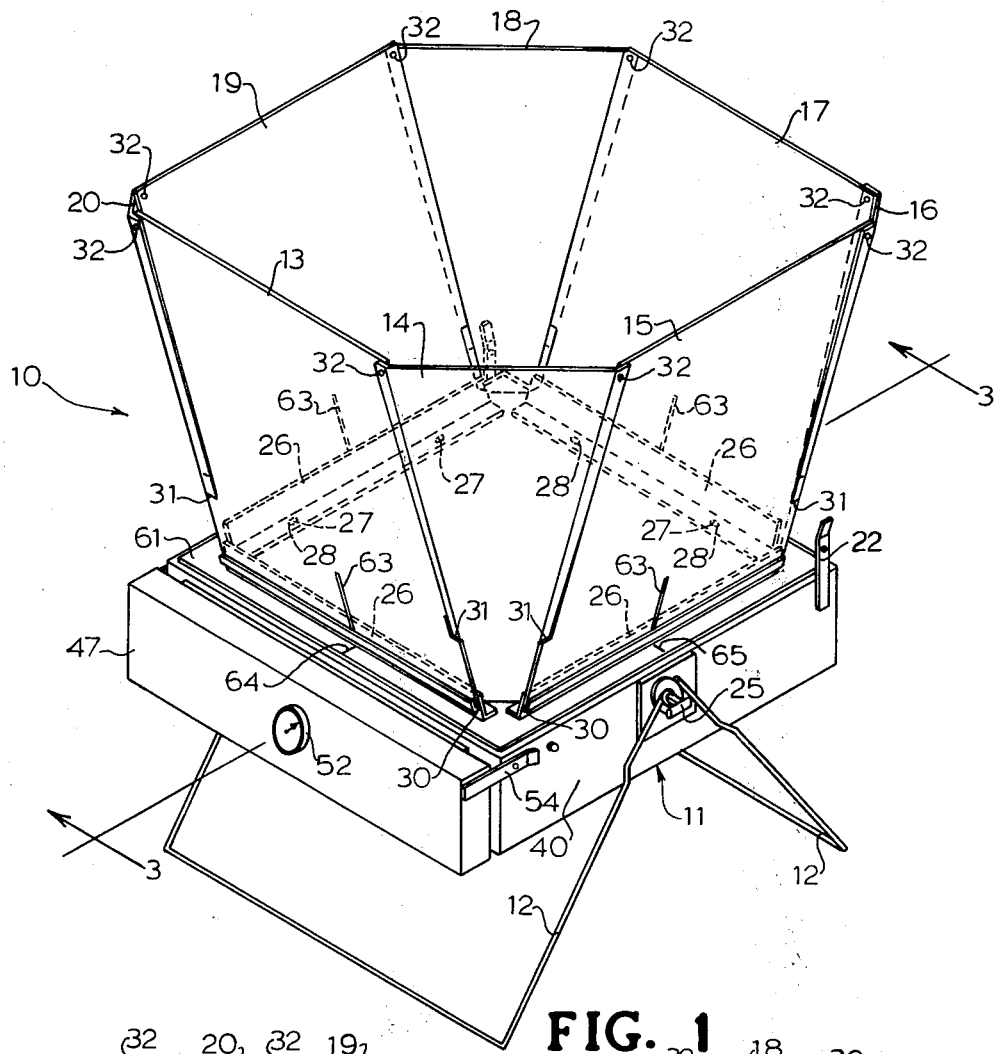
FIG. 1 is a pictorial view illustrating the solar cooker construction adapted for cooking with the housing and oven compartment in a tilted position so that the sun reflectors are positioned to most efficiently trap the sun's radiation.

With reference to the drawings, there is illustrated a portable solar cooker 10 comprising a generally box-like housing 11, support legs 12, four removably mounted side sun reflectors 13, 15, 17, 19, and four trapezoidal corner sun reflectors 14, 16, 18 and 20. Support legs 12 are pivotally mounted to allow cooker 10 to be tilted to a position substantially normal to the incident solar rays when it is desired to cook with the cooker 10 in an angled or tilted position and also allows for legs 12 to be utilized as a handle for carrying purposes when the cooker is not in use. Pivot/mount knob 25 allows for loosening or tightening upon legs 12.

Housing 11 is formed by outer walls made from sheet metal, plastic or other suitable materials. Housing 11 encloses an oven compartment 41 which is defined by a bottom 42, a heat collector roof 43, side walls 44, 45 (not shown) and back wall 46. The front side of oven 41 is closed by a door 47 which is designed to fit snugly over the front of oven 41 to form a substantially airtight seal with the aid of rubber seal 47a. A cooking tray 48 (shown in dashed lines) slidably fits into oven 41 by means of door 47. Door 47 pivots about hinge 49 and has a small hole 50 of diameter sufficient to receive in a sliding fit manner the shaft portion 51 of a cooking thermometer 52 for external reading of the oven temperature. As seen in the drawings, the spacing between outer walls 40 and oven compartment 41 is filled with a suitable insulating material 53 as is the inside of door 47. A pair of latches 54 and 55 (not shown) secures door 47 when closed.

Figure 3:
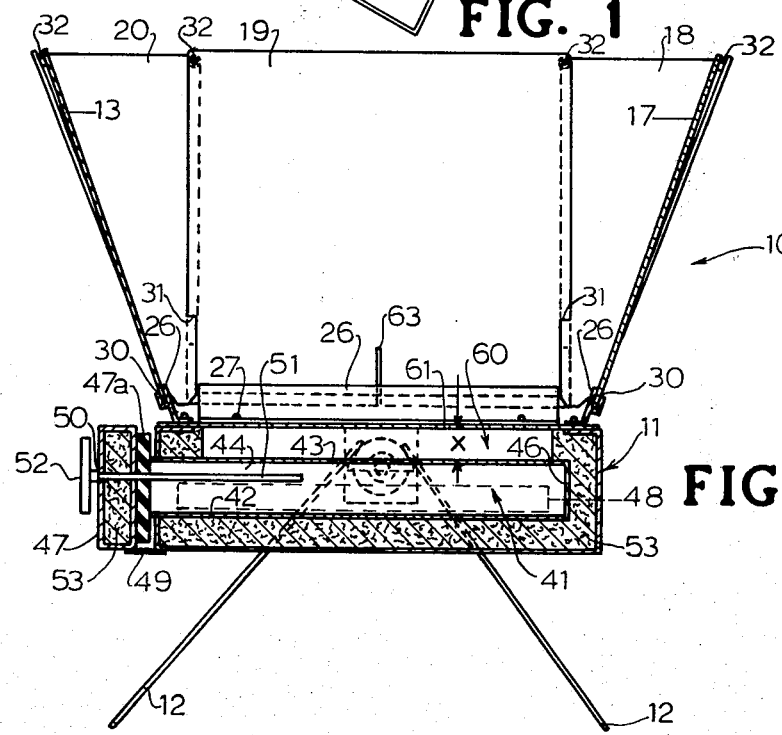
FIG. 3 is a side elevation section view taken substantially along line 3—3 of FIG. 1 illustrating how the sun reflectors are installed on the cooker housing.
Figure 4:
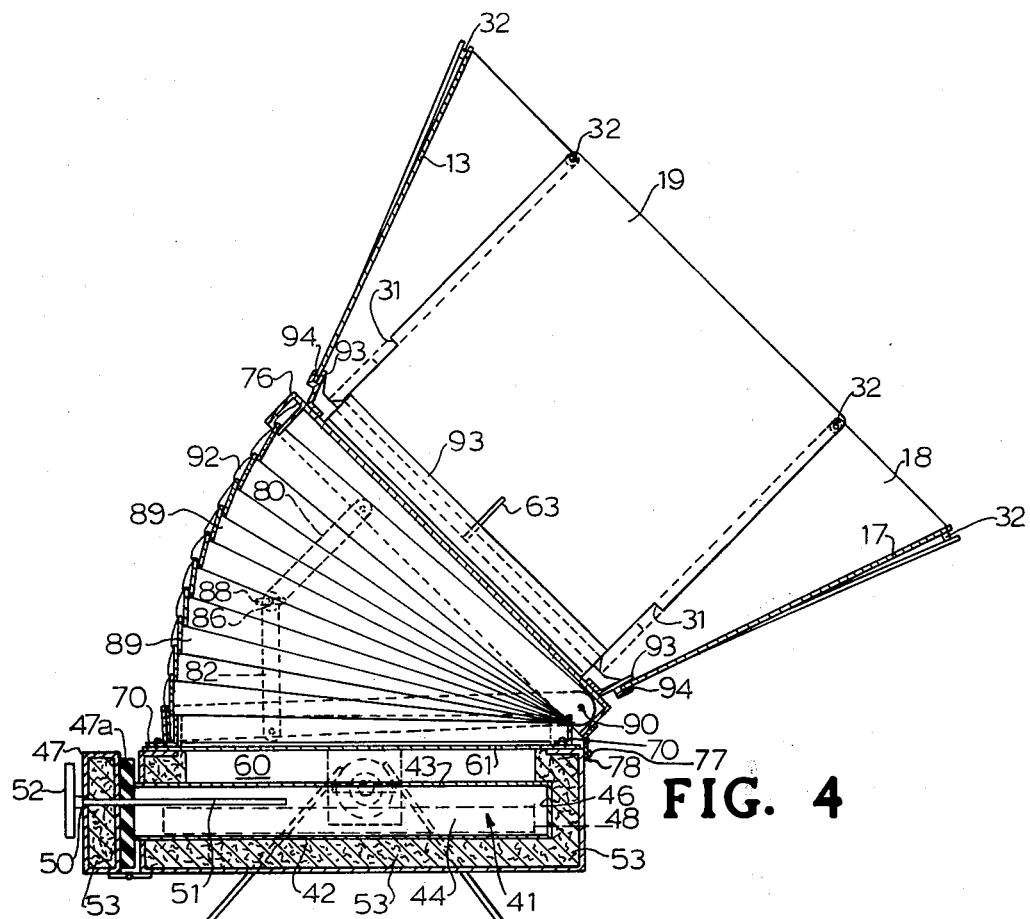
FIG. 4 is a side elevation section view taken substantially along line 4—4 of FIG. 2 illustrating how the telescoping reflector strip assembly is installed and how the sun reflectors are, in turn, installed on the telescoping reflector strip assembly.

Referring to FIGS. 3 and 4, a heat generating area 60 is situated directly above oven compartment 41. As illustrated, oven compartment 41 is surrounded by insulating material 53. The tops of each piece of insulation are cut away to receive a sheet of glazing comprising a heat shield 61 made from a substantially clear fiberglass sheet. Heat shield 61 is appropriately secured to the top of housing 11. Shield 61 overlies heat generating area 60 which, in the present embodiment, provides an air space of approximately 0.7874 inches (20 mm) in depth (dimension X) overlying roof 43 of oven compartment 41. The top surface of roof 43 is painted black to enhance its ability to absorb solar energy. Briefly stated, solar energy is trapped under shield 61 and transferred therethrough into heat generating area 60 and onto the black top surface of heat collecting roof 43 of oven compartment 41 and then is transmitted through roof 43 into oven compartment 41.

Four removable brackets 26 are secured to the outer edges of the top of housing 11 by screws 27 passing through holes 28 in brackets 26 and holes 29 (not shown) in the top of housing 11. Brackets 26 are substantially L-shaped with the base leg portions having holes 28 predeterminably spaced therein. The vertical leg portions of brackets 26 are outwardly inclined slightly and have channels 30 made integrally therewith for receiving sun reflector panels 13, 15, 17, 19, therein. Brackets 26, as previously mentioned, are removably secured on the top outer edges by screws 27. Holes 28 in the base leg portions of brackets 26, and holes 29 (not shown), in the top of housing 11, are designed to align for receiving screws 27. Sun reflectors 13, 15, 17 and 19 are side panel reflectors and are slidably received in channels 30 of the vertical leg portions. Once in channels 30, reflectors 13, 15, 17 and 19 are held snugly in place therein. Reflectors 13, 15, 17 and 19 have cut-outs or notches 31 located in the outer lower edges thereof. Cut-outs 31 receive in a sliding fit manner therein trapezoidal corner light reflector panels 14, 16, 18, and 20. Reflector members 13, 14, 15, 16, 17, 18, 19 and 20 have mating snap fits 32 located in the outer top edges thereof and which snap together to hold reflectors 13-20 together as a unit supported by channels 30 of brackets 26. FIG. 1 illustrates portable cooker 10 set up for use in the manner just described where housing 11 and oven compartment 41 may be tilted for cooking without causing any problems with the product being cooked. Pivot/mount knob 25 is slightly loosened until housing 11 is positioned in the desired manner at which time pivot mount/knob 25 is retightened.

To aid in properly positioning portable solar cooker 10 so that as much as possible of the sun's energy is captured for cooking purposes, alignment slits 63 are cut into the lower midportions of panels 13, 15, 17, 19 perpendicular to the bottom edges of light reflector panels 13, 15, 17 and 19. As the sun changes its position, pivot/mount knob 25 is loosened slightly so that housing 11 and oven compartment 41 may be angled or tilted to the desired position. This proper positioning is accomplished by initially turning cooker 10 towards the sun and slightly tightening pivot/mount knob 25. During positioning of cooker 10, as in FIG. 1, slits 63 allow the sun's rays to pass through reflectors 13, 15, 17 and 19 where the slits are located to form light streaks on the top side edges of housing 11 as indicated at 64, 65. Cooker 10 is adjusted until the light streaks are perpendicular to and aligned with the slits. Cooker 10 is then properly positioned for gathering the sun's energy and cooking within oven compartment 41. Slits 63 are used in a similar manner with the embodiment of FIG. 2.

Figure 2:
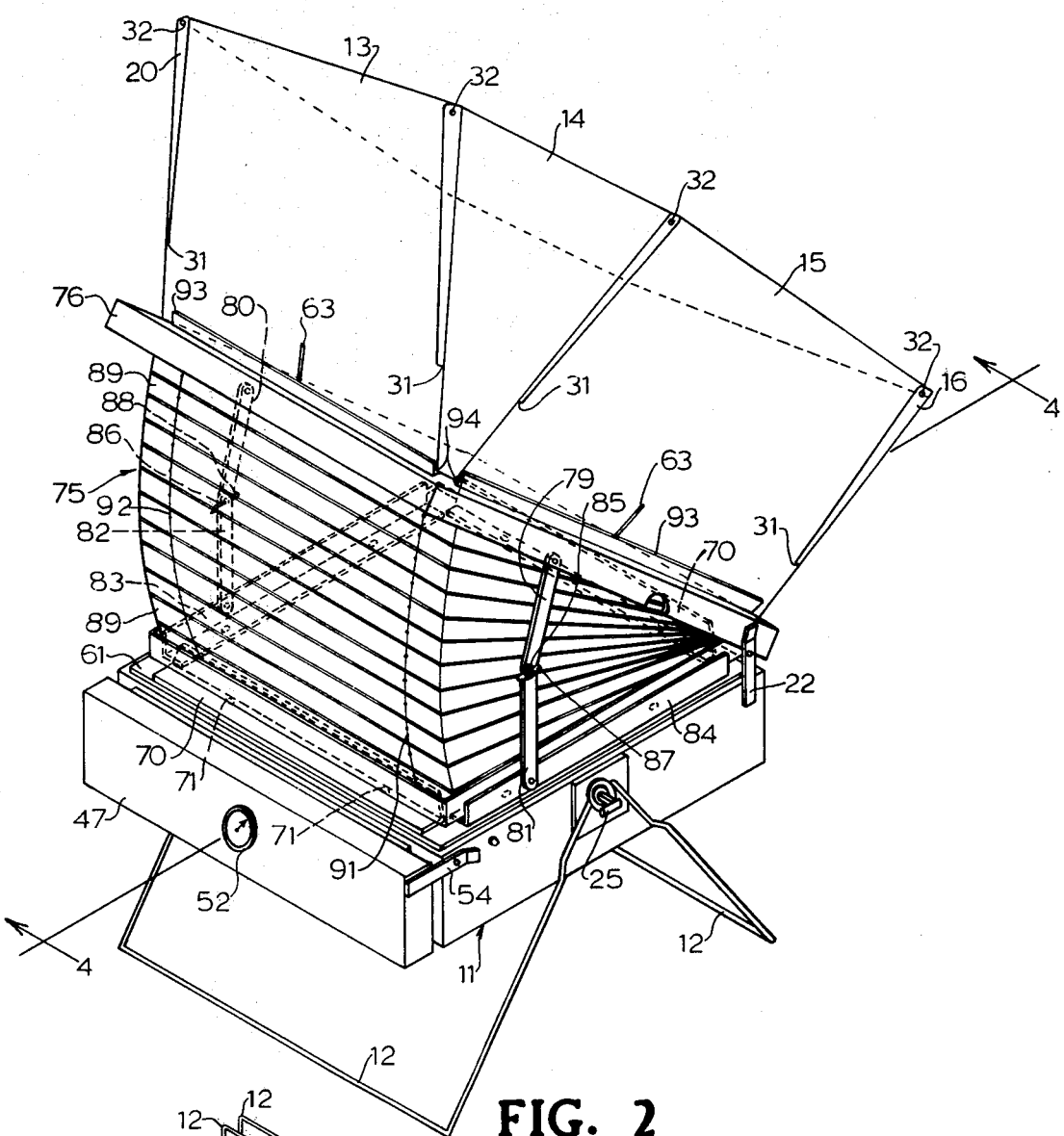
FIG. 2 is a pictorial view illustrating the solar cooker construction adapted for cooking with the housing and oven compartment maintained in a level position and with the telescoping reflector strip assembly installed and moved into the most efficient position to trap the sun's radiation.
Figure 6:
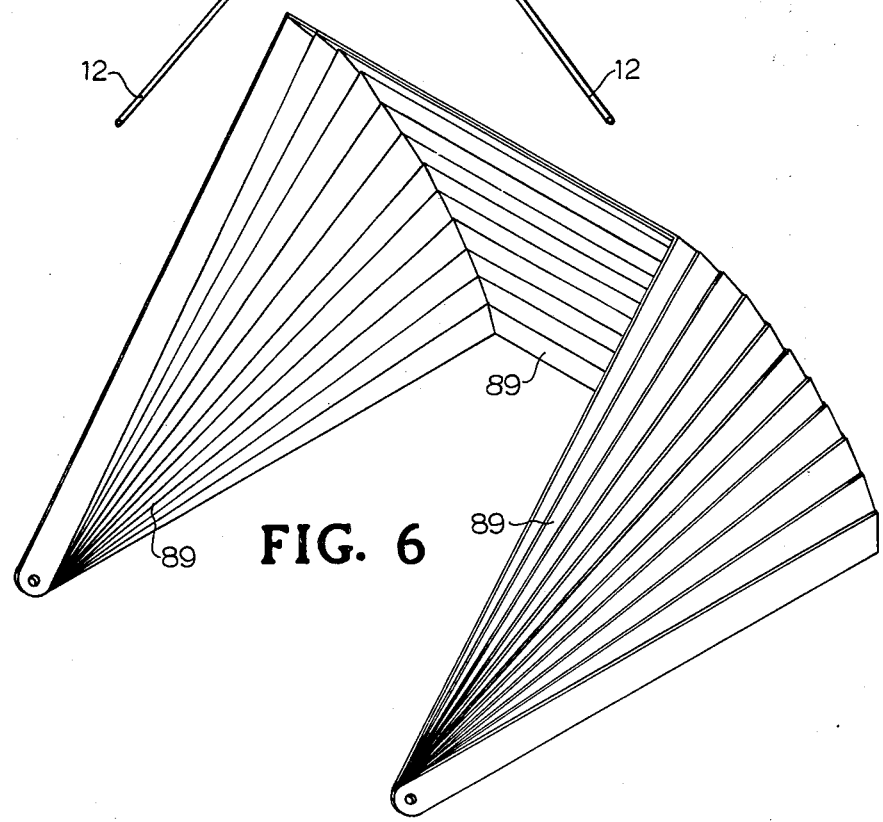
FIG. 6 is a pictorial view of the telescoping reflector strip assembly removed from the cooker.

Turning now to a description of FIGS. 2, 4 and 6, solar cooker 10 in these figures is illustrated as being adapted for cooking with housing 11 and oven compartment 41 maintained in a level condition. In order to adapt cooker 10 of FIGS. 1 and 3 to the cooker of FIGS. 2 and 4, brackets 26 must be removed once the sun reflectors 13 through 20 are unsnapped and removed from brackets 26. Screws 27 are removed to take off brackets 26. A pair of angle brackets 70 are positioned on the top edge surface of housing 11 and are secured in place with screws 27 which pass through holes 71 in brackets 70 and tighten into holes 29 (not shown) in the top of housing 11. One of the brackets 70 is positioned adjacent the front or door end of housing 11 and the other of brackets 70 is positioned to the rear or end opposed to door 47.

A telescoping strip assembly 75 comprised of U-shaped strips of a reflecting material 89 is now ready for installation on housing 11. A top frame 76 is hingedly connected to housing 11 at the rear thereof by screws 77 which pass through hinge 78 and fasten into the back wall of housing 11. Hinge 78 is integrally secured on its other side to frame 76. Once screws 77 are tightened, frame 76 is now pivotally secured to housing 11. A pair of arms 79, 80 are pivotally secured to frame 76 at a predetermined location and extend downward from the inside surface of frame 76. A second set of arms 81, 82 are pivotally secured to a pair of brackets 83, 84. Arms 81, 82 are pivotally linked to arms 79, 80 by screws 85, 86 and wing nuts 87 and 88 (not shown). With arms 79, 81 and 80, 82 linked together respectively by screw 86 and wing-nut 88, brackets 83 and 84 are ready for securement to the top of housing 11 by screws 27. Once brackets 83, 84 are secured, top frame 76 can now be raised or lowered while pivoting about hinge 78. Once top frame 76 is in the desired position, wing-nuts 87, 88 are tightened and in effect locks the arms in a fixed position. Telescoping reflector strips 89 are pivotally secured at one end to top frame 76 so that they pivot about pin 90. Reflector strips 89 are formed so that each fits over the other, see FIG. 6. Strips 89 are linked together by any suitable means which in this case is illustrated as a pair of cords 91, 92 integrally secured to each of the reflector strips 89. When wing-nuts 87, 88 are loosened and top frame 76 raised, strips 89 are spread from their overlapping position into an open relation as shown in FIG. 2.

Four brackets 93 are integrally secured to the top edge surfaces of top frame 76. Brackets 93 are identical in construction to brackets 26 but are in this case integral with top frame 76. Brackets 93 have vertically angled leg portions which are outwardly inclined slightly and have channels 94 made integral therewith for receiving light reflector panels 13, 15, 17 and 19 therein. Once placed in channels 94, reflectors 13, 15, 17, 19 are snugly in place and trapezoidal corner sun reflectors 14, 16, 18, 20 are placed in cutouts 31 located in the outer lower edges of reflectors 13, 15, 17 and 19. The reflector members 13 through 20 are snap fit together. Once assembly 75 and reflectors 13 through 20 are completely installed, then cooker 10 is ready to be properly positioned to receive the sun's energy for cooking. In this arrangement, cooker 10 is maintained level and telescoping reflector strips 89 are opened with the raising of top frame 76. Frame 76 is raised until the sun's rays pass through the slits in reflectors 13, 17 and the rays fall on the top side edges of frame 76. Once this is completed, cooker 10 is turned until the sun's rays also pass through the slits in reflectors 15, 19 and fall on the top side edges of frame 76. The cooker is now ready for cooking with housing 11 maintained in a level manner. Adjustments can be made throughout the cooking cycle to maintain the proper orientation of the reflectors with respect to the angle of maximum solar radiation. This is accomplished by loosening wing-nuts 87, 88 and properly aligning the sun's rays through the slits and retightening the wing-nuts.

Figure 5:
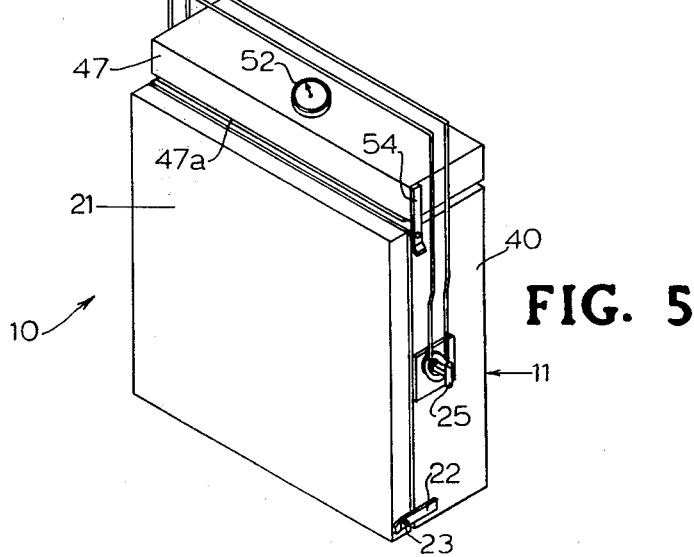
FIG. 5 is a pictorial view illustrating the portable solar cooker of the present invention collapsed and ready for storage or transporting to another location.

For purposes of storage or transporting the unit to another location, cooker 10 is provided with a cover 21. Cover 21 is shaped to fit onto housing 11 to cover heat shield 61 and protect it from damage. In the first arrangement in which housing 11 could be tilted for cooking, cover 21 may be installed once reflectors 13 through 20 are removed from brackets 26. Cover 21 will reside over brackets 26 and snap fit into appropriate retainer means 22 as buttons 23 on the sides of cover 21 are received by retainer means 22. In the second arrangement in which housing 11 is maintained level for cooking, cover 21 may be installed once reflectors 13 through 20 are removed from brackets 93 and telescoping reflector strip assembly 75 collapsed into a flat position upon the loosening of wing-nuts 87, 88. A pair of retainer pieces 22 are integrally secured to the sides of frame 76 and receive buttons 23 on the sides of cover 21 and, in effect, covers telescoping reflector strip assembly 75 and heat shield 61. Once cover 21 is installed in either arrangement, support legs 12 are moved together by loosening pivot/mount knobs 25 and thereby forming a handle once pivot/mount knobs 25 are retightened. FIG. 5 illustrates this position. The reflector plates 13–20, once removed, may be conveniently stored within cover 21.

The described U-shaped interior light reflecting telescoping type wall has been found practical in application. In use, it will be seen that such wall structure establishes a light collecting opening surrounded by the bottom edges of the reflector plates and provides an extensible and collapsible wall surrounding the space between such light opening and the heat shield. Thus, the oven compartment can remain level during cooking and the plane of the light collecting opening can be adjusted to remain perpendicular to the light rays as the sun changes position.

I claim:

1. A portable solar oven comprising:
   (a) an insulating housing having a base member and front and rear wall portions and opposed side wall portions extending outwardly therefrom and defining an opening in the side of said housing opposite said base member;
   (b) a solar energy trapping shield member extending between said wall portions parallel to said base member and covering the opening defined thereby;
   (c) an oven compartment enclosed within the lower portion of said housing and positioned in spaced relation to said energy trapping shield member, with said oven compartment being provided with a means for access into the interior thereof;
   (d) a light reflecting assembly positioned on the wall portions of said housing adjacent to the edges of said energy trapping shield member and adapted to direct solar radiation impinging thereon to said shield member, said light reflecting assembly comprising:
   (i) a rectangular frame member having one side pivotally connected to the rear wall of said housing;
   (ii) a plurality of light reflecting panels removably mounted on the upper periphery of said frame member and angled outwardly therefrom;
   (iii) an extensible and collapsible U-shaped wall structure having an upper end connected to the underside of said frame member, a lower end connected to said housing and surrounding said plate and comprised of U-shaped strips of a reflecting material linked together in an overlapping telescoping arrangement such that the raising of said frame member causes the wall to become extended and when lowered the wall is caused to collapse; and
   (iv) means for securing said frame member in the desired raised position.

2. A solar oven according to claim 1 including angle brackets removably mounted on the wall portions of said housing for positioning said light reflecting assembly.

3. A solar oven according to claim 1 wherein said light reflecting panels include substantially rectangular side panels and trapezoidal corner panels with each of the side edges of each trapezoidal panel being engageable with and secured to the corresponding edge of the laterally adjacent substantially rectangular side panel to form a reflecting enclosure extending outwardly from said frame member.

4. A solar oven according to claim 3 wherein each of said substantially rectangular reflecting panels contains a light emitting slit extending vertically from the midpoint of the bottom edge thereof to provide a means for aligning said reflecting assembly with respect to the angle of maximum solar radiation.

5. A portable solar oven comprising:
   (a) an insulating housing having an opening with a solar energy trapping shield member and an oven compartment below said shield member; and
   (b) a light reflecting assembly mounted on said housing for directing solar radiation to said shield member comprising:
   (i) an extensible and collapsible wall structure mounted on said housing and surrounding said shield member with an internal light reflecting surface and adapted when said oven compartment is level and said wall structure is extended to a position appropriate to a particular position of the sun to establish a light collecting opening in a plane perpendicular to the lines of radiation and a light reflecting wall structure surrounding the space between said light collecting opening and said shield member to transmit solar radiation gathered in said light collecting opening to said shield member;
   (ii) a plurality of light reflecting panels mounted on said wall structure surrounding said light collecting opening; and
   (iii) means for securing said wall structure in various positions to accommodate changes in the position of the sun while allowing said oven compartment to remain level.

* * * * *